POWER LADDER

Original Filed Dec. 28, 1966 4 Sheets-Sheet 1

POWER LADDER

Original Filed Dec. 28, 1966 4 Sheets-Sheet 3

United States Patent Office

Re. 27,808
Reissued Nov. 13, 1973

27,808
POWER LADDER

Yigal Michelson, P.O. Box 71, Pardess-Hanna, Israel

Original No. 3,424,271, dated Jan. 28, 1969, Ser. No. 605,347, Dec. 28, 1966. Application for reissue Nov. 27, 1970, Ser. No. 93,517
Claims priority, application Israel, Oct. 17, 1966, 27,706
Int. Cl. E04g *1/18, 3/10, 3/16*
U.S. Cl. 182—14 11 Claims

Matter enclosed in heavy brackets [ ] appears in the original patent but forms no part of this reissue specification; matter printed in italics indicates the additions made by reissue.

ABSTRACT OF THE DISCLOSURE

A power ladder that has a V-shaped frame that can straddle a tree, the frame supporting an upwardly extending inclined tower on which a carriage moves. Manually operated control means is provided in the carriage for operatively connecting a power source to either or both front wheels that support the outer ends of the arms of the frame for moving and steering the power ladder in a desired direction and this can be accomplished regardless of the position of the carriage on the tower.

The present invention concerns power ladders for use in orchards, and has as its object to provide a power ladder which is of simple, compact construction and thus cheap to manufacture when compared to the known power ladders and is easily maneuverable so that the operator on the ladder can reach any part of a tree without having to leave the ladder.

The invention consists of a power ladder comprising a base constituted by two arms spaced apart at their rear ends, each front end being supported by one wheel pair, the joined rear ends being supported by a caster wheel, a tower fixed to the rear end of the arms in a position leaning forward on a median plane between the arms, a carriage carrying an operator's seat, and four independent mechanical control means for causing the carriage to be raised along the tower, for lowering it thereon, and for causing the forward and rearward movement of each wheel pair independent of the other.

The invention is illustrated, by way of example only, in the accompanying drawings in which.

Figure 1:
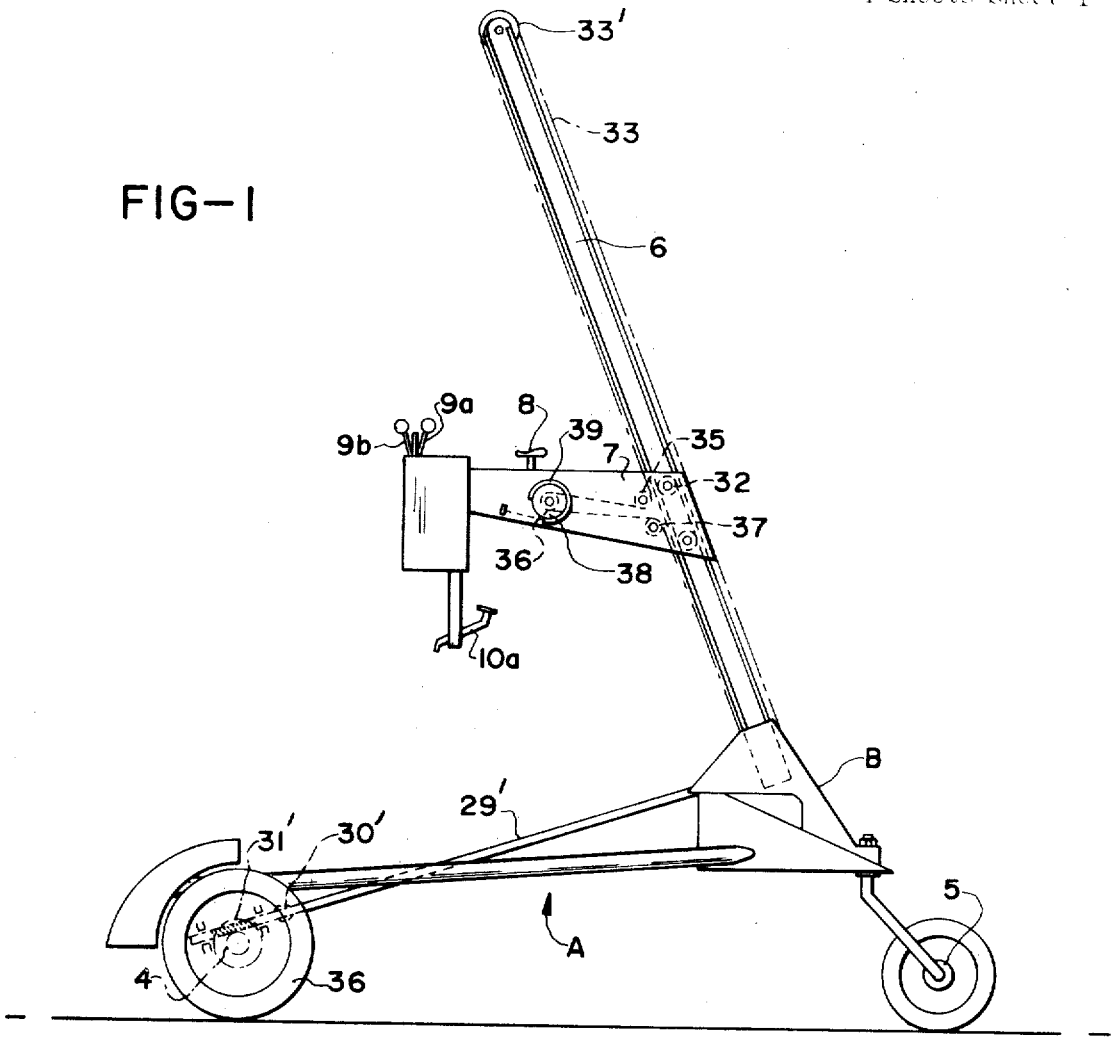
FIG. 1 is a side elevation of the power ladder according to the invention.

The power ladder according to the invention comprises a base generally indicated at A and being constituted by two arms 1 and 2 separated from each other at their front ends and connected at their rear to a motor and gear housing, generally indicated at B. The front end of the arms 1, 2 are each supported by a pair of wheels 3 turning on a common shaft 4, while the rear end of the base A, i.e., housing B is supported by a caster wheel 5. A tower 6, constituted by an I-beam is immovably fixed to the housing B and its supporting frame and leans forward towards the front end of arms 1, 2 along a median line between them. A carriage, provided on tower 6 and generally indicated at 7 carries the operator's seat 8, hand-operated controls 9a, 9b for controlling the forward and rearward movement of each wheel pair 3 independent from the other, and foot-operated controls *10a and 10b* [10, 10'] for raising and lowering the carriage on tower 6 in a manner to be described more fully hereinbelow.

However, it can be seen from the above brief description that the construction of the power ladder according to the invention permits it to embrace a tree trunk, to be turned into desired position around the latter using either wheel pair 3 as a pivot, and to raise or lower the carriage to a convenient position to perform any desired operation on the tree such as harvesting or pruning for example. Even if containers filled with picked fruit are depended from the carriage 7, when the latter is in a high position on the tower, the power ladder will be stable, since with a raising of the carriage the center of gravity is shifted towards the front where the wheels 3 are spaced apart to provide a sturdy support. When containers, filled with fruit, are to be emptied it is not necessary for the operator to descend from the ladder in order to empty them, since the frame of the ladder can straddle a collecting bin.

The control of the movement of the wheels and the carriage can be effected by any desired mechanical, pneumatic, hydraulic or electrical means and is not limited to that described hereinafter. In the example illustrated here in detail, the entire operation of the ladder is powered by a motor 11 which turns a gear train constituted by two pairs of gears 12a, 12a' and 12b, 12b' all rotating continuously at the same speed, gears 12a, 12a' being associated with wheels 3a, and gears 12b, 12b' being associated with wheels 3b, the gears of each pair turning in opposite directions. The function of one gear pair 12a, 12a' for the operation of wheel pair 3a will [only] *first* be described, it being understood that the function of gear pair 12b, 12b' for the operation of wheel pair 3b, is exactly the same. On the shafts 13 of gears 12a, 12b, which shafts are supported in bearings 14, fixed to a dividing wall 14' in housing B, friction pulleys 15a, 15a', respectively are mounted (FIGS. 3 and 4) and rotate continuously therewith. V-belts 16a, 16a', respectively, are adapted to connect these pulleys to a double-grooved pulley wheel 17 adapted to turn on a shaft 18 which is mounted to change its position slightly. This change in position is brought about by means of a small lever 19 one end of which is attached to the bearing of shaft 18, the other being fixed on the gudgeon 20 turnable in a fixed support (not shown). A bar 21, one end of which is fixed on gudgeon 20 has its other end attached to a cable 22. Cable 22 is fixed with both its ends to the top of tower 6 and runs as follows: from one of its ends down over guide wheels 23a, control wheel 24, guide wheel 23b, past the connection of bar 21, over guide wheel 23c at the bottom of tower 6, up over guide wheel 23d over control wheel 25, and over guide wheel *23e* [23a], up to its connection at the top of tower 6. Guide wheels 23a, 23b, 23c, 23d, *23e* and wheels 24, 25 are fixed on the carriage 7 so that the vertical movements of the latter will not affect the action of the cable 22. Control wheels 24, 25 are fixed one above the other to the hand control lever 9a, which is adapted to be moved by the operator from a center position, in either the forward or backward direction around a pivot 26 between wheels 24, 25. This causes the wheels 24, to move slightly back, while wheel 25 moves slightly forward, or reversely as the case may be, whereby the cable stretch 22 between wheels 23b and 23c moves downwards or upwards. Thus the connected end of bar 21 is moved downwards, causing pulley wheel 17 to be moved, respectively, to the left, or right (FIGS. 4 and 5). whereby belt 16a is made taut while belt 16a' is made slack or respectively belt 16a' is taut and belt 16a is slack. Pully 17 will now be turned by pulley 15a or 15a' and will cause the rotation either clockwise or anticlockwise, as the case may be, of a shaft 18 which, through the intermediary of a universal joint 28, drives the shaft 29 leading to wheel pair 3a. The shaft is a split one, i.e., it is of two parts which permit it to be slightly lengthened or shortened, as known per se in order to compensate for the position of shaft 18. The rotation of shaft 29 is transferred by means of a universal joint 30 to a worm gear 31 (visible only in FIG. 1 in connection with wheel pair 3b) which in turn rotates tion.

Figure 4:
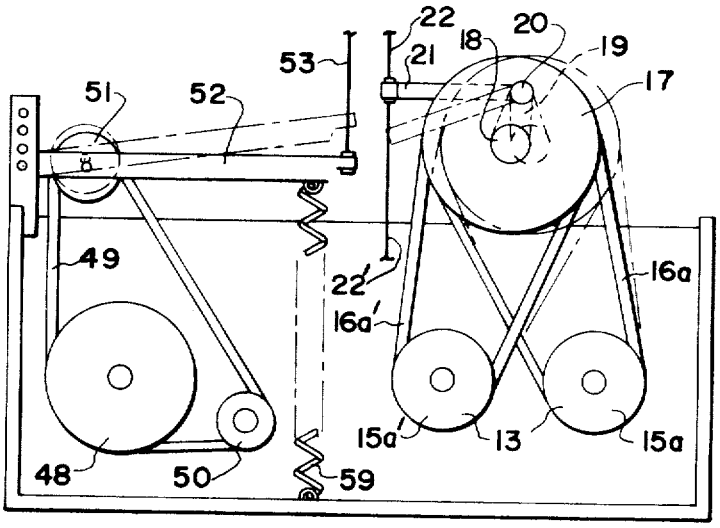
FIG. 4 is a partial elevational view thereof.
Figure 5:
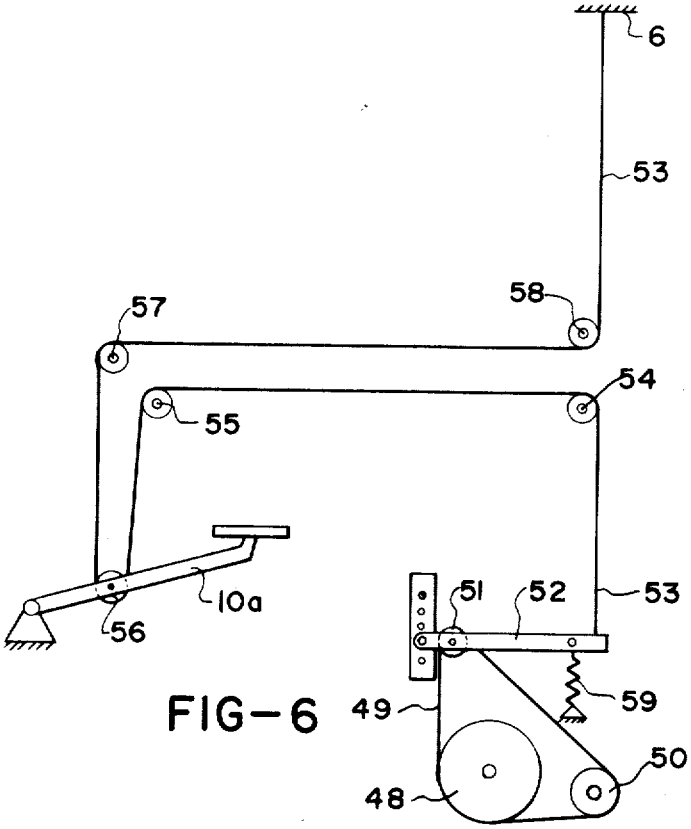
FIG. 5 shows schematically the steering means for one wheel pair of the power ladder according to the invention.
Figure 6:
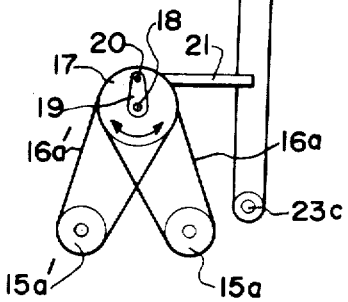
FIG. 6 shows similarly the means for raising the carriage with operator's seat.
Figure 9:
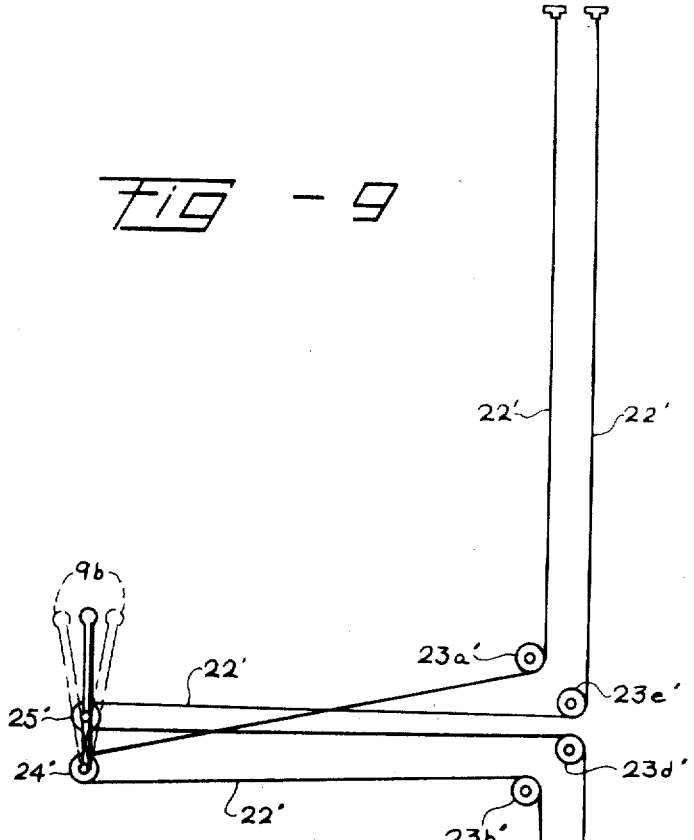
*FIG. 9 shows schematically the steering means for the other wheel pair of the power ladder according to the invention.*
Figure 9:
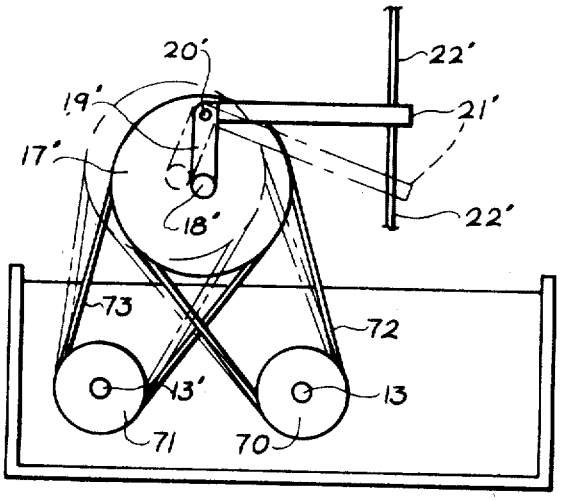
Figure 8:
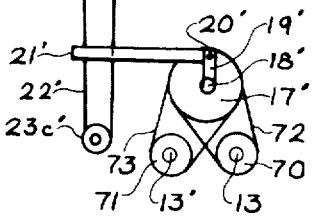
*FIG. 8 is a view somewhat the same as FIG. 4 except that the companion belt and pulley drive reversible mechanism for the other pair of drive wheels is illustrated.*

*In FIGS. 8 and 9, I illustrate the mechanisms for operating the other pair of wheels 3b in either a forward or reverse direction. The pair of gears 12b and 12b' shown in FIG. 3, rotate two shafts 13 and 13', see FIG. 8, and these two shafts rotate friction pulleys 70 and 71, continuously so long as the motor 11 operates. V-belts 72 and 73, respectively, are adapted to connect these pulleys 70 and 71 to a double-grooved pulley wheel 17' that is similar to the double-grooved pulley wheel 17 and is adapted to turn on a shaft 18' which is mounted to change its position slightly. This change in position is brought about by means of a small lever 19' one end of which is attached to the bearing of shaft 18', the other being fixed on a gudgeon 20' turnable in a fixed support (not shown). FIG. 8 does not show the pulleys 15a, 15a' and 17 and the belts 16a and 16a' because they are shown in FIG. 4.*

*A bar 21', one end of which is fixed on gudgeon 20' has its other end attached to a cable 22', see FIGS. 8 and 9. The cable 22' is fixed with both of its ends to the top of the tower, shown schematically in FIG. 9, and the cable 22' runs as follows: from one of its ends down over guide wheels 23a', control wheel 24', guide wheel 23b', past the connection of bar 21', over guide wheel 28c' at the bottom of the tower 6, up over guide wheel 23d', over control wheel 25', and over guide wheel 23e' up to its connection at the top of the tower 6. Guide wheels 23a', 23b', 23c', 23d', 23e' and wheels 24' and 25' are fixed on the carriage 7 so that the vertical movements of the latter will not affect the action of the cable 22'. Control wheels 24' and 25' are fixed one above the other to the hand control lever 9b, in FIG. 9, and this control level is adapted to be moved by the operator from a center full line position, in an either forward or backward direction around a pivot 26' which is placed between the wheels 24' and 25'. This causes the wheel 24' to move slightly back while the wheel 25' moves slightly forward, or reversely as the case may be, whereby the cable stretch 22' between wheels 23b' and 23c' moves downwardly or upwardly.*

Figure 2:
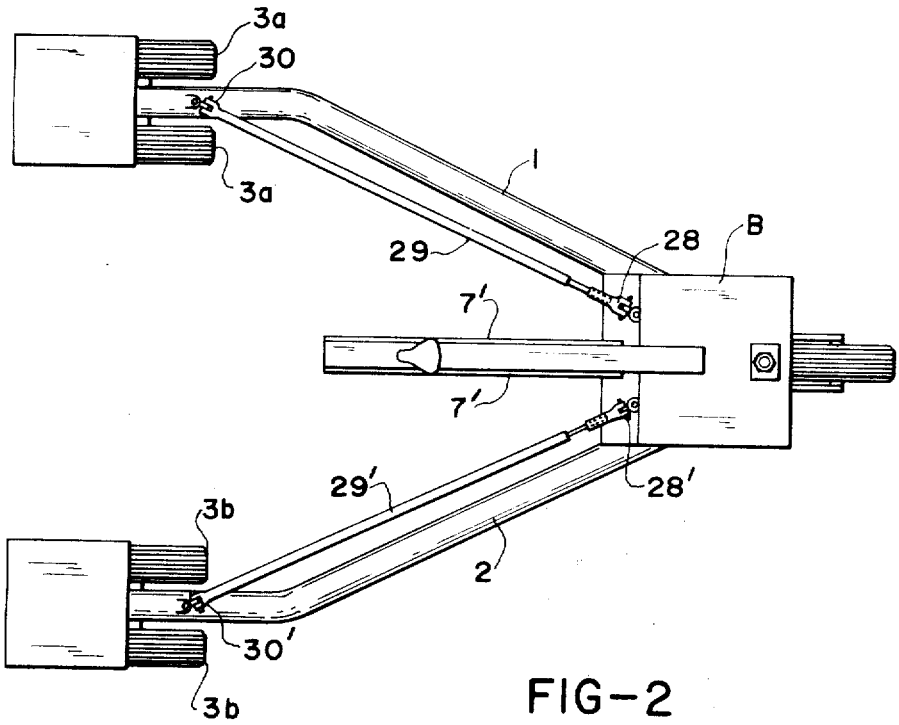
FIG. 2 is a plan view thereof.

*Thus the connected end of bar 21' is moved downwards, causing pulley wheel 17' of FIG. 8 to be moved, respectively, to the left or right, see FIG. 8, whereby belt 72 is made taut while belt 73 is made slack, or, respectively, belt 73 is made taut and belt 72 made slack. The pulley 17' will now be rotated by pulley 70 or 71 and will cause the rotation either clockwise or counterclockwise, as the case may be, of the shaft 18' which, through the intermediary of a universal joint 28', see the dot-dash line showing in FIG. 3, drives the other telescopic shaft 29', leading to the other wheel pair 3b, see FIG. 2. The rotation of the shaft 29' is transferred by means of a universal joint 30' to a worm gear 31, see FIG. 1, and this worm gear rotates shaft 4 and the pair of wheels 3b in either a forward or reverse direction.* Since there are two hand controls [9] *9a and 9b* to each of which a cable 22 or *22'* and set of pulleys 17, 15 *or 17', 70 and 71* is associated, the wheel pairs 3a, 3b can be moved together with or independent of the other, whereby the power ladder has great maneuverability.

Figure 3:
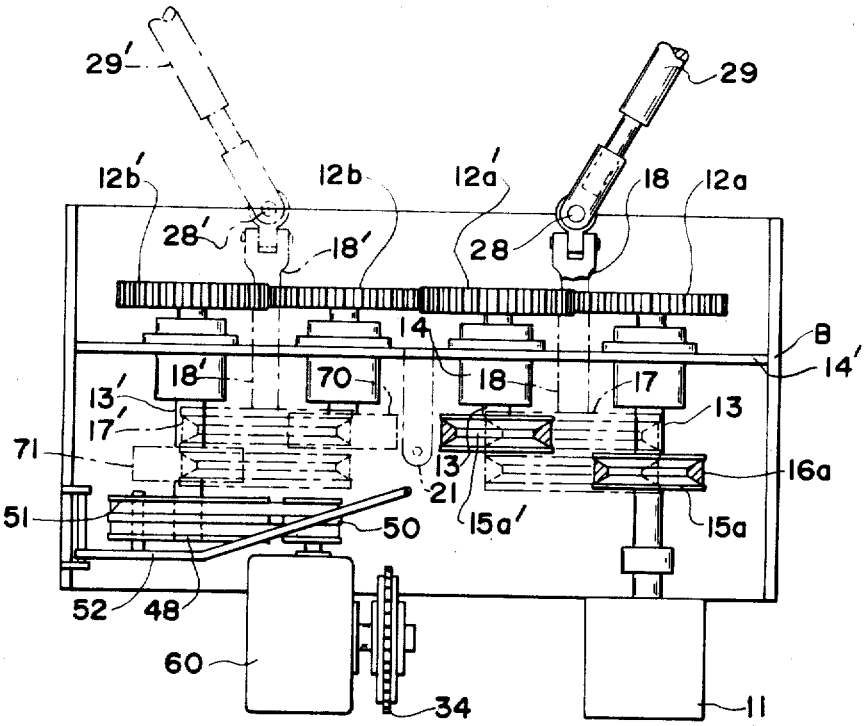
FIG. 3 is a partly schematic plan view of the power transmission of the ladder according to the invention.
Figure 7:
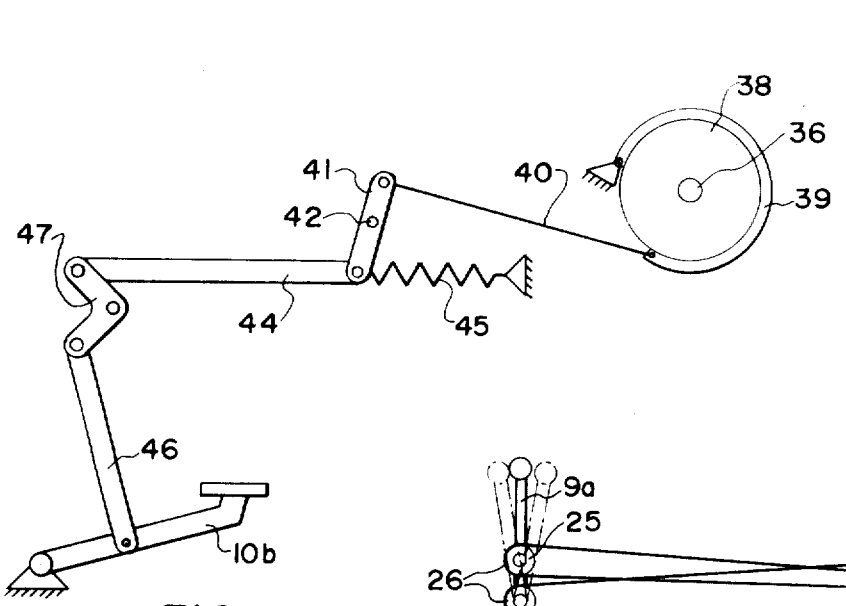
FIG. 7 shows schematically the means for permitting the lowering of said carriage.

The carriage 7 is constituted by two walls 7' which at the ends opposite the controls carry rollers 32 to guide the carriage along tower 6. An endless chain 33 extends over tower 6 and is guided at the top over wheel 33', past guide wheel 35, over sprocket wheel 36, past guide wheel 37 all mounted in carriage 7, and at the bottom of the tower over a sprocket wheel 34 (FIG. 3). Sprocket wheel 36 is mounted on the same shaft as a brake wheel 38 surrounded by a brake lining 39 fixed to the carriage at one end and at the other by means of a rod 40 to a small lever 41 which is pivotal around its center 42. A push rod 44 keeps lever 41 in a position pulling rod 40 and thus brake lining 39 in contact with brake wheels 38 to keep the chain engaged on sprocket wheel 36 so that the carriage remains in position. In order to release the sprocket wheel so that it turns freely and no longer engages the chain, permitting the carriage to slide downwards along the chain, the foot pedal 10b through the intermediary of a rod 46 and a lever 47 and rod 44 pulls the bottom of lever 41, whereby its top pushes rod 40 against the action of, a spring 45 to release the brake lining 39 from brake wheel 38.

The intermittent rotary movement of the chain 33, when it is desired to raise the carriage 7 is carried out in the following manner. The shaft 13 of gear 12b' is extended and carried a wheel 48 which by means of a V-belt is adapted to drive pulleys 50 and 51. On the shaft of pulley 51 a bar 52 is mounted to the end of which a cable 53 is attached. Cable 53 runs over guide pulleys 54, 55, 56, 57, 58, all mounted in the carriage and is fixed to the top of tower 6. The foot pedal 10a is fixed to the shaft of pulley 56 and when the former is depressed by the operator, bar 52 is lifted causing belt 49 to be taut and thereby to cause the rotation of pulley 50. A worm gear transmission (not shown), and housed within enclosure 60 is rotated by pulley 50 and rotates in turn sprocket wheel 34 causing the rotation of chain 33. The ratio of the worm gear transmission is a high one, e.g., 60 to 1, whereby a braking action in the movement of the chain is achieved.

The carriage can be adapted to support containers for the reception of picked fruit, a spray gun for spraying trees or any other equipment required. If desired, the tower can be made collapsible for easier transportation of the power ladder, i.e., the housing B together with the tower 6 may be pivotally attached to the base A so as to be made to collapse thereon when not in use.

It is, of course, possible to substituted any known mechanical means for those described hereinabove. Thus, by way of example only, instead of gear train 12, a series of sprockets rotated by a chain may be used. The mechanical controls may be replaced by electric, pneumatic or hydraulic ones. Instead of the pulley system 15–17 a clutch means engaging the shaft directly may be provided.

It is possible, with the power ladder above described, to utilize the rotation of the gears 12 for powering tools used by the operator, e.g. pruning shears.

I claim:

1. A power ladder comprising:

(a) a base constituted by two arms spaced apart at their front ends and joined at their rear ends;

(b) each front end being supported by a drive wheel;

(c) the joined rear ends being supported by a castor wheel;

(d) a tower fixed to the rear end of the arms in a position leaning forward on a medium plane between the arms;

(e) a carriage for supporting an operator and having four independent mechanical control means for causing the carriage to be raised along the tower, for lowering it thereon, and for causing the forward and rearward movement of each drive wheel to be independent of the other;

(f) the power for raising the carriage and for the movement of the drive wheels being provided by a motor which causes the turning of a train of two pairs of gears, one pair being associated with each drive wheel and effecting its movement, one of the gears of one pair driving in addition the means for raising the carriage on the tower.

2. A power ladder as claimed in claim 1, wherein:

(a) a pulley turns on the shaft of each gear;

(b) the pulleys by means of V-belts being adapted alternately to rotate a further pulley when the latter has been made to engage the corresponding V-belt;

(c) said engagement being effected by means of a hand control on the carriage transmitted by means of a cable.

3. A power ladder as claimed in claim 1, wherein:

(a) the carriage is held in position on the tower by means of an endless chain vertically surrounding the tower; and (b) engaging the carriage by means of a sprocket wheel governed by a brake.

4. A power ladder as claimed in claim 3, wherein:

(a) the brake is adapted to be released by means of a foot pedal control on the carriage to permit the latter to slide down along the tower and chain.

5. A power ladder as claimed in claim 3, wherein:

(a) the chain is rotated to raise the carriage along the tower by means of a sprocket wheel adapted to be rotated by said one gear, through the intermediary of (b) a worm gear rotated by a pulley adapted to receive its rotation by means of (c) a foot control through the intermediary of a cable.

6. A power ladder driving and steering mechanism comprising:

(a) a movable base;

(b) a first and a second pair of laterally spaced apart drive wheels each adapted to be driven forwardly or rearwardly independently of the other for propelling said base forwardly or rearwardly and for steering said base;

(c) a tower supported by said base;

(d) an operator-supporting carriage movable on said tower;

(e) a train of two pairs of intermeshing gears;

(f) power means for rotating the two gears of the first pair in opposite direction, the train of gears also causing the two gears of the second pair to rotate in opposite directions;

(g) a pulley associated with each gear and rotated by the gear;

(h) a double-grooved pulley for each pair of gears and a pair of belts loosely connecting a first double-grooved pulley to the pulleys operatively connected to said first pair of gears so that the double grooved pulley will remain idle, and another pair of belts loosely connecting a second double-grooved pulley to the pulleys operatively connected to said second pair of gears so that the second double-grooved pulley will remain idle;

(i) means mounted in said carriage and controlled by the operator for shifting said first double-grooved pulley in one direction to tighten one of the pair of belts and cause one of the gear driven pulleys associated with that belt to rotate said first double-grooved pulley in one direction or for shifting said first double-grooved pulley in another direction to tighten the other of the pair of belts and cause the other of the gear driven pulleys associated with that belt to rotate said first double-grooved pulley in the opposite direction;

(j) a drive shaft operatively connected to said first double-grooved pulley so as to be rotated in one direction or in an opposite direction according as to how the operator shifts the pulley, said drive shaft being operatively connected to the first of said drive wheels for driving it forwardly or rearwardly;

(k) means mounted in said carriage and controlled by the operator for shifting said second double-grooved pulley in one direction to tighten one of the second pair of belts and cause one of the second pair of gear driven pulleys associated with that belt to rotate said second double-grooved pulley in one direction or for shifting said second double-grooved pulley in another direction to tighten the other of the second pair of belts and cause the other of the second gear driven pulleys associated with that belt to rotate said second double-grooved pulley in the opposite direction; and (l) a second drive shaft operatively connected to said second double-grooved pulley so as to be rotated in one direction or in an opposite direction according as to how the operator shifts the second double-grooved pulley, said drive shaft being operatively connected to the second drive wheel for driving it forwardly or rearwardly independently of said first drive wheel.

7. The combination as set forth in claim 6, and in which:

(a) said movable base is constituted by two arms spaced apart at their front ends and joined at their rear ends, each front end being supported by one of said drive wheels, the joined rear ends being supported by a castor wheel;

(b) said train of gears being positioned adjacent to where the two arms are joined, and said first-mentioned drive shaft that connects to one of the drive wheels extending substantially parallel to one of the arms, and the second-mentioned drive shaft that connects to the other drive wheel extending substantially parallel to the other arm.

8. The combination as set forth in claim 6, and in which:

(a) the first-mentioned operator actuated means for shifting said first double-grooved pulley includes means movable with the carriage to permit said first means to function regardless of the position of the carriage on the tower and whether the carriage is moving or is stationary on the tower; and in which (b) the second-mentioned operator actuated means for shifting the second-mentioned double-grooved pulley can function independently of the first-mentioned operator actuated means and includes means movable with the carriage to permit said second means to function regardless of the position of the carriage on the tower and whether the carriage is moving or is stationary on the tower.

9. The combination as set forth in claim 6, and in which:

(a) the first-mentioned operator actuated means for shifting said first double-grooved pulley includes a pivoted bar;

(b) a cable extending throughout the length of the tower and connected to said bar;

(c) a control lever on said carriage, said cable being operatively connected to said lever to permit it to swing said bar and shift said first double-grooved pulley in either one of two directions regardless of the position of the carriage on the tower to make the first drive wheel to go forward or reverse;

(d) the second-mentioned operator actuated means for shifting said second double-grooved pulley includes a second pivoted bar;

(e) a second cable extending throughout the length of the tower and connected to said second bar; and (f) a second control lever on said carriage, said second cable being operatively connected to said second lever to permit it to swing said second bar and shift said second double grooved pulley in either one of two directions regardless of the position of the carriage on the tower to make the second drive wheel to go forward or reverse.

*10. In combination:*

*(a) a movable base;*

*(b) first and second drive wheels movably supporting said base and being laterally disposed with respect to each other, each drive wheel being adapted to be driven forwardly or rearwardly independently of each other for propelling said base forwardly or rearwardly and for steering said base;*

*(c) a first reversible belt drive mechanism operatively connected to said first drive wheel and a second revrsible belt drive mechanism operatively connected to said second drive wheel;*

*(d) power means for operating said first and second reversible belt drive mechanisms;*

*(e) a first manually controlled means for connecting said power means to said first reversible belt drive mechanism for causing said first drive wheel to rotate forwardly or rearwardly independently of said second reversible drive mechanism and its associate second drive wheel; and*

*(f) a second manually controlled means for connecting said power means to said second reversible belt drive mechanism for causing said second drive wheel to rotate forwardly or rearwardly independently of said first reversible drive mechanism and its associate first drive wheel; it being possible to actuate independently said first or second manually controlled means or to simultaneously actuate both said first and second manually controlled means for causing both first and second drive wheels to rotate forwardly or rearwardly or for causing both drive wheels to rotate in opposite directions.*

*11. The combination as set forth in claim 10: and in which*

(a) *said first reversible belt drive mechanism includes a first double-grooved pulley operatively connected to said first drive wheel;*

*(b) a first pair of pulleys operatively connected to said power means so as to be rotated in opposite directions;*

*(c) a first pair of belts loosely, connecting said first double-grooved pulley to said first pair of pulleys so that said double-grooved pulley with remain idle;*

*(d) said first manually controlled means including means for shifting said first double-grooved pulley in one direction to tighten one of the first pair of belts and cause one of said first pair of pulleys associated with that belt to rotate said double-grooved pulley in one direction to rotate said first drive wheel in one direction or for shifting said double-grooved pulley in another direction to tighten the other one of said first pair of belts and causing the other of said first pair of driven pulleys associated with that belt to rotate said double-grooved pulley in the opposite direction to rotate said first drive wheel in the opposite direction;*

*(e) said second reversible belt drive mechanism including a second double-grooved pulley operatively connected to said second drive wheel;*

*(f) a second pair of pulleys operatively connected to said power means so as to be rotated in opposite directions;*

*(g) a second pair of belts loosely connecting said second double-grooved pulley to said second pair of pulleys so that said second double-grooved pulley will remain idle; and*

(h) *said second manually controlled means including means for shifting said second double-grooved pulley in one direction to tighten one of the second pair of belts and cause one of said second pair of pulleys associated with that belt to rotate said second double-groved pulley in one direction to rotate said second drive wheel in one direction or for shifting said second double-grooved pulley in another direction to tighten the other one of said second pair of belts and causing the other of said second pair of driven pulleys associated with that belt to rotate said second double-grooved pulley in the opposite direction to rotate said second drive wheel in the opposite direction.*

References Cited

The following references, cited by the Examiner, are of record in the patented file of this patent or the original patent.

UNITED STATES PATENTS

| | | | |
|---|---|---|---|
| 2,969,849 | 1/1961 | Grant | 182—2 |
| 867,828 | 10/1907 | McGill | 180—6.66 |
| 2,626,671 | 1/1953 | Hardy | 180—6.66 |
| 3,016,973 | 1/1962 | Williamson | 182—14 |
| 3,043,395 | 7/1962 | Volkel | 182—2 |
| 3,176,794 | 4/1965 | Evans et al. | 182—148 |
| 3,344,885 | 10/1967 | Rasmussen | 182—103 |
| 3,498,398 | 3/1970 | Burrough et al. | 180—6.66 |

REINALDO P. MACHADO, Primary Examiner

U.S. Cl. X.R.

182—63, 148